Oct. 29, 1940.  R. B. WHITEMAN  2,219,642
WINDOW SCAFFOLD
Filed Jan. 13, 1940  4 Sheets-Sheet 1
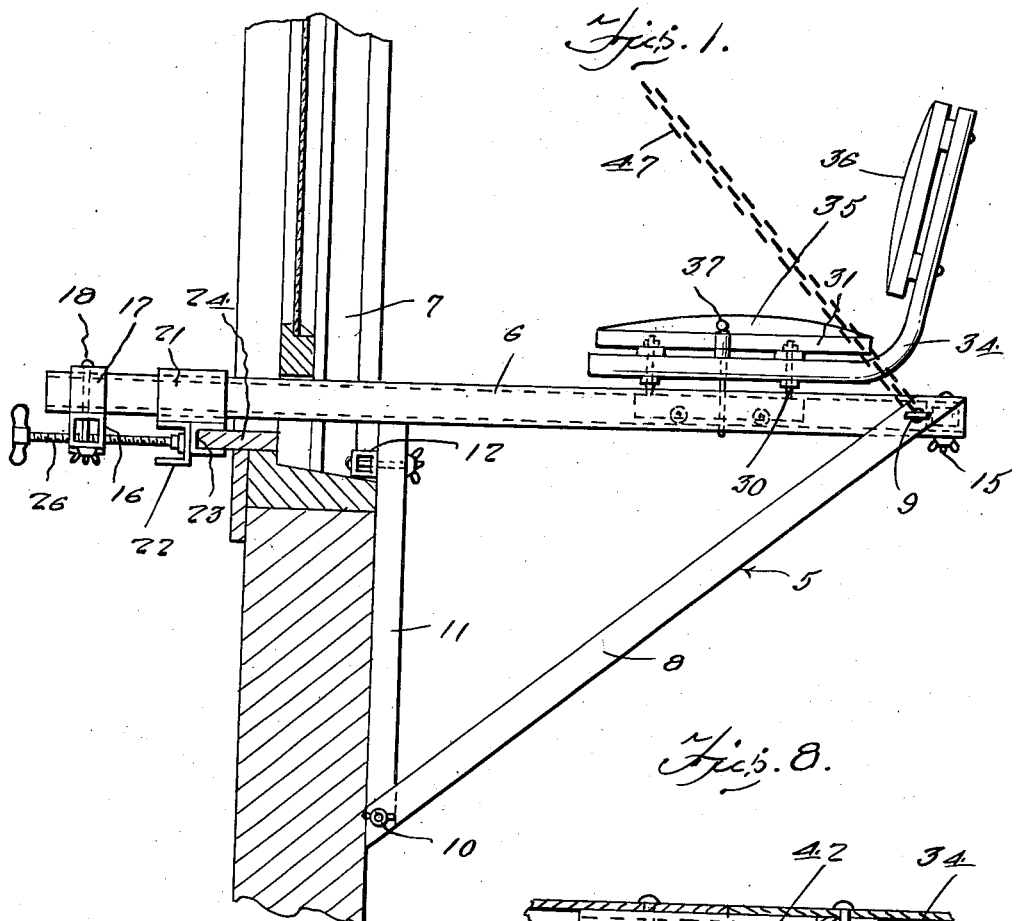
Inventor
Roy B. Whiteman
By Clarence A. O'Brien
and Hyman Berman
Attorneys

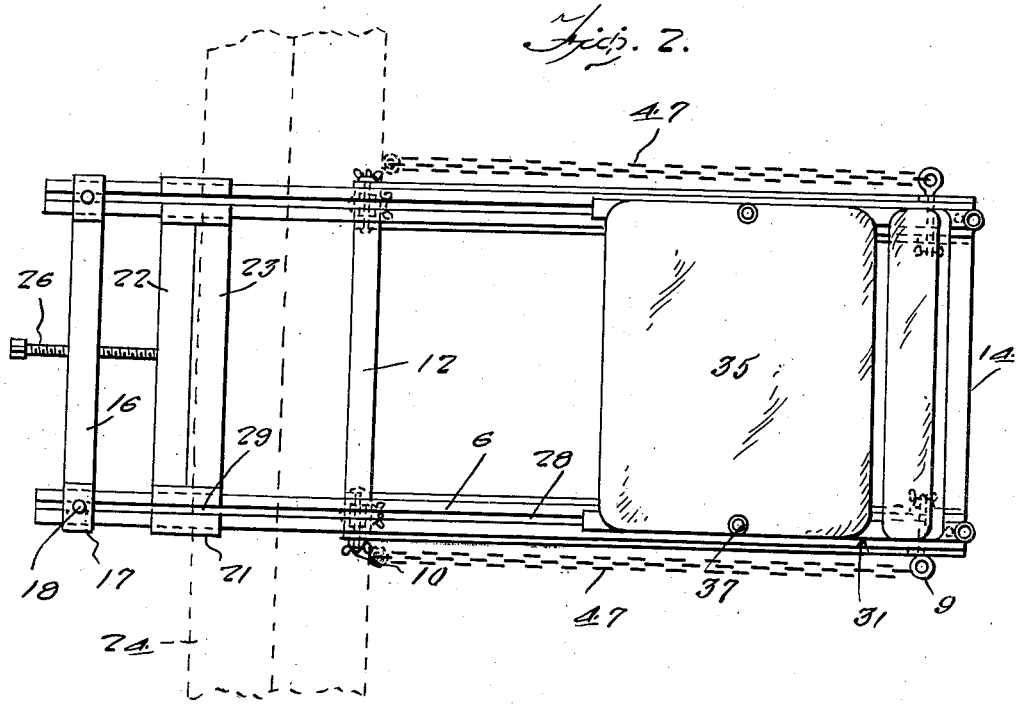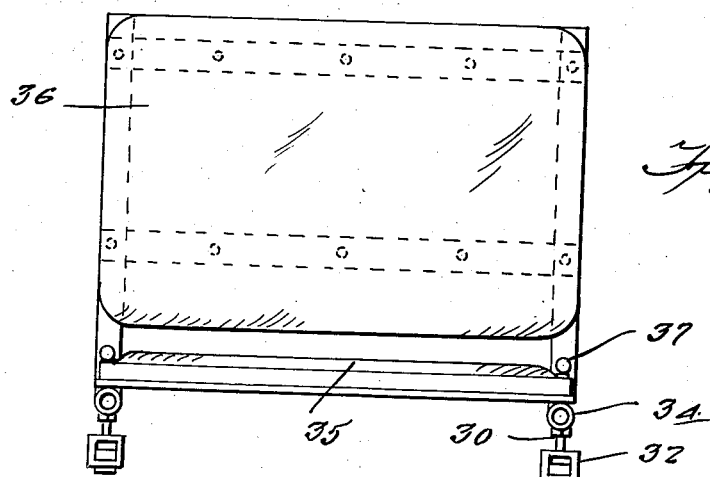

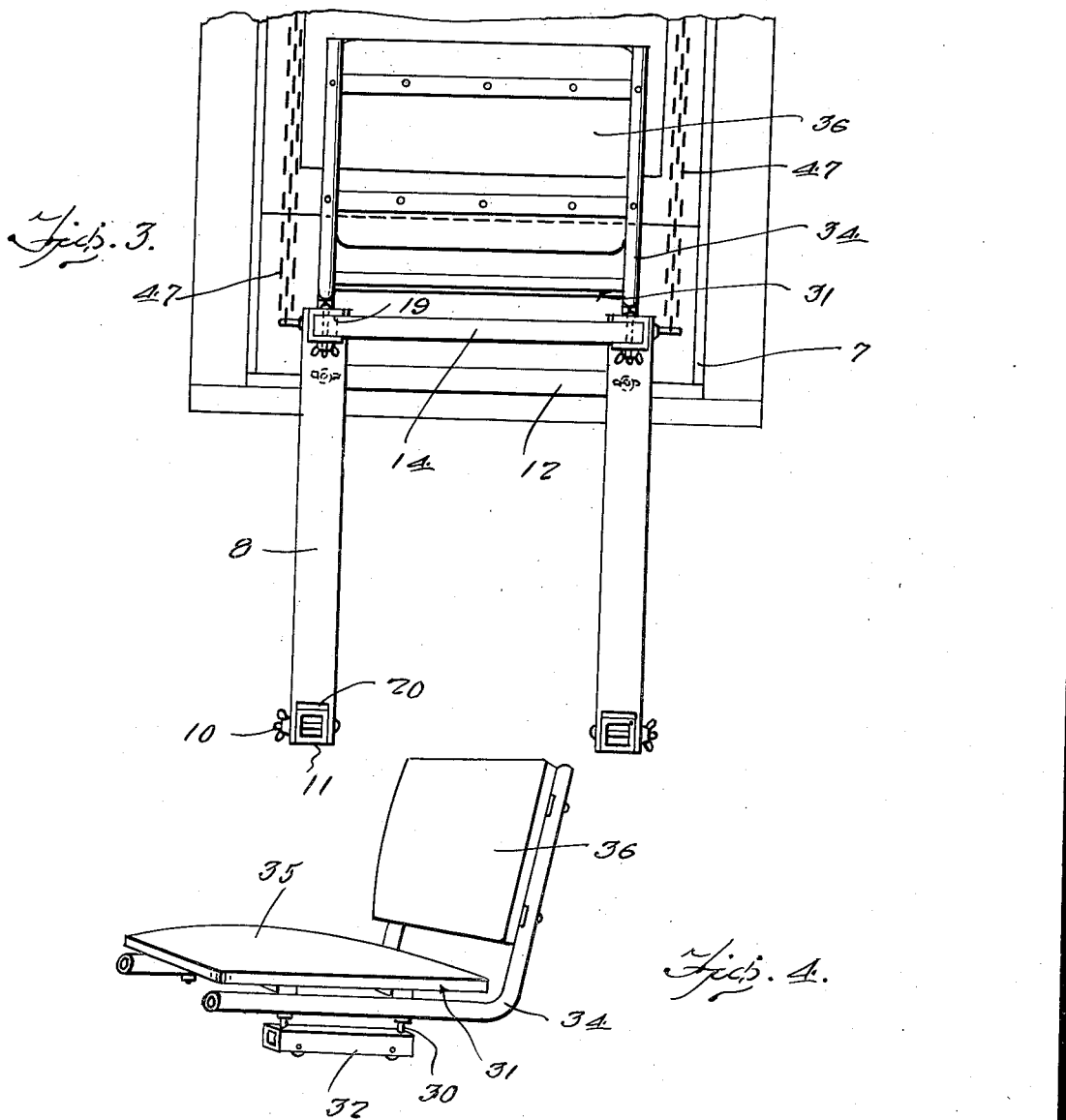

Oct. 29, 1940.    R. B. WHITEMAN    2,219,642
WINDOW SCAFFOLD
Filed Jan. 13, 1940    4 Sheets-Sheet 4

Inventor
*Roy B. Whiteman*

By *Clarence A. O'Brien
and Hyman Berman*
Attorneys

UNITED STATES PATENT OFFICE 2,219,642

WINDOW SCAFFOLD

Roy B. Whiteman, East Chicago, Ind.

Application January 13, 1940, Serial No. 313,796

5 Claims. (Cl. 304—27)

The present invention relates to window scaffolds for supporting a seat or platform on the outside of a window in a convenient position for washing or repairing the window, and has for its primary object to provide a bracket projecting outwardly of the window and including a track upon which a seat is slidably mounted together with screw means for clamping the bracket to the window sill.

A further object is to provide a convertible seat comprising a tubular frame and legs and in which the legs are separably connected to the seat and back portion to adapt the seat for slidably mounting on the scaffold bracket.

Another object is to provide a device of this character which is collapsible and capable of easy and quick assembling and mounting in position on the window, which embodies simplicity of construction, although strong and durable and is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view,

Figure 2 is a top plan view,

Figure 3 is a rear elevational view,

Figure 4 is a perspective view of the convertible seat,

Figure 5 is a front elevational view of the seat with the legs removed,

Figure 10:
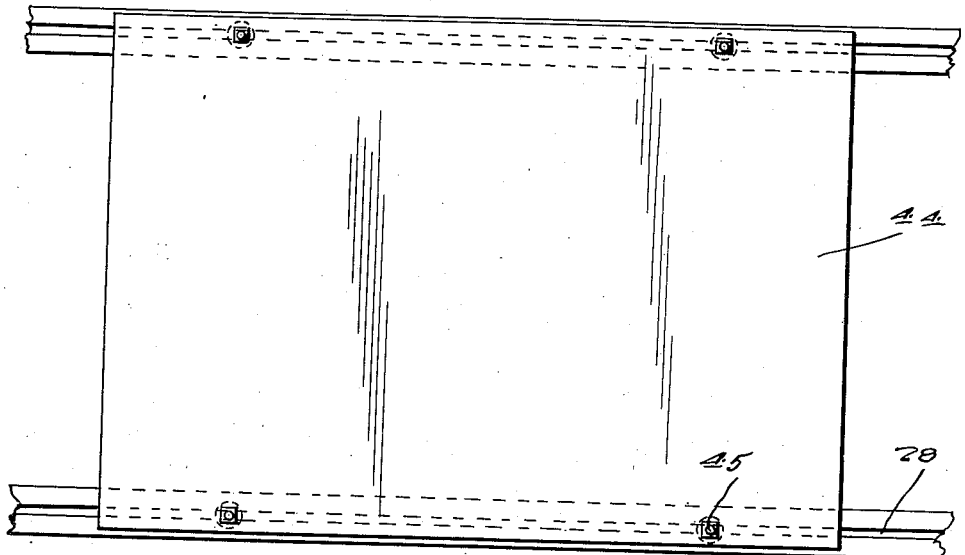
Figure 11:
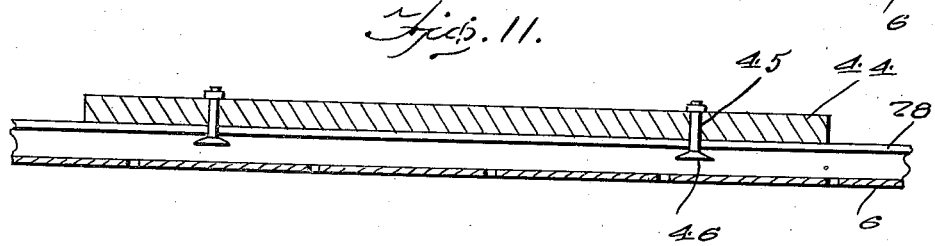
Figure 9:
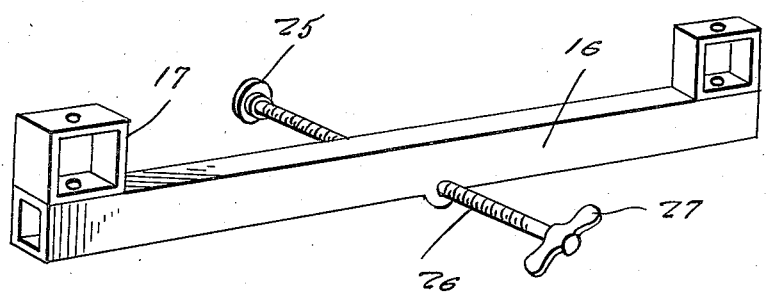

Figure 6 is a front elevational view of the track and sill engaging clamping bar, Figure 7 is a longitudinal sectional view of the roller mounting for the seat, Figure 8 is a fragmentary longitudinal sectional view of the coupling between the tubular sections of the seat, Figure 9 is a perspective view of the clamping bar and screw, Figure 10 is a top plan view of the platform interchangeably mounted on the tracks, and Figure 11 is a longitudinal sectional view through one of the tracks showing the platform thereon.

Referring now to the drawings in detail, the numeral 5 designates the bracket or scaffold generally which is constructed of a pair of horizontal, spaced parallel tracks 6—6 extending outwardly through a window 7.

Inclined braces 8—8 are connected by eye bolts or wing nuts 9 to the outer ends of the tracks and extend downwardly for connection by bolts and wing nuts 10 to the lower ends of vertical braces 11—11. The upper ends of the vertical braces are connected by a cross bar 12 by means of bolts and wing nuts 13 and the outer ends of the tracks are connected by a spacing bar 14 by means of bolts and wing nuts 15. The front ends of the tracks are also connected by a spacing bar 16 which is provided with collars 17 for receiving the tracks to position the spacing bar 16 crosswise beneath the tracks, the bar being secured in position by bolts and wing nuts 18.

The tracks 6, braces 8 and 11, and the cross bar 12 and spacing bars 14 and 16 are preferably constructed of tubular metal of square shape in cross section and the outer ends of the tracks are cut away as shown at 19 to receive the ends of the spacing bar 14, while the lower ends of the braces 8 are bifurcated as at 20 to receive the vertical braces 11.

Slidably mounted on the tracks are a pair of collars 21 welded to a pair of opposed channel bars 22 and 23, the bar 23 being adapted to receive the window sill 24 and the bar 22 forming an abutment for the head 25 on one end of a screw 26 which is threaded through the spacing bar 16 and provided at its other end with a manipulating handle 27.

The tracks 6 and collars 21 on their upper surfaces are provided with registering longitudinal slots 28 and 29 respectively for slidably accommodating hangers 30 suspended from a seat 31. On the lower ends of the hangers are tubular roller supports 32 freely positioned in the tracks 6 and on which rollers 33 are journalled for riding in the tracks.

The seat includes tubular side rails 34 on which the seat cushion 35 is secured and a back 36. Anchoring pins 37 extend downwardly from the sides of the seat through registering openings 38 and 39 in the roller support and track, respectively, to secure the seat in adjusted position on the track, the pins being projected downwardly by springs 40.

When the seat 31 is not in use on the scaffold as shown in Figure 1, the same may be converted into a chair as shown in Figure 4 by providing the continuous tubular legs 41 which are connected to the ends of the rails 34 by means of rods 42 inserted in the abutting ends of the legs and rails and secured in position by bolts and wing nuts 43.

Also in place of the seat 31 a platform 44 may be substituted having bolts 45 extending from the underside thereof into the slots 28 of the tracks and provided with heads 46 on their lower ends to prevent accidental removal from the tracks.

From the foregoing it will be apparent that the several parts forming the scaffold may be assembled in position for mounting in the window as shown in Figure 1, the seat or platform slidably mounted on the tracks and the scaffold clamped to the sill by the screw 26. The spacing bar 14 limits outward movement of the seat and the collars 17 limit inward movement thereof.

The eye bolts 9 may be utilized for attaching a guard chain 47 extending upwardly to the window frame and when the platform 44 is in use the eye bolts may serve as attaching means for the conventional safety belt of the workman.

It is believed the details of construction and operation of the device will be readily apparent from the foregoing without further detailed explanation.

What I claim is:

1. A window scaffold comprising a frame including a pair of horizontal tubular tracks, transverse spacing bars detachably secured to the tracks adjacent opposite ends, a transverse channel member slidably mounted at the inner ends of the tracks adapted to receive a window sill at the inside of the window, screw means carried by the inner spacing bar and engaging the transverse channel member for clamping the channel member to the sill, braces for the outer ends of the tracks adapted to abut the outside of a wall beneath the window, said braces being detachably connected to the tracks and a seat slidably mounted on said tracks.

2. A window scaffold comprising a frame including a pair of horizontal tubular tracks, spacing bars detachably secured to the tracks adjacent opposite ends, a channel member slidably mounted at the inner ends of the tracks adapted to receive a window sill at the inside of the window, screw means carried by the inner spacing bar for clamping the channel member to the sill, braces for outer ends of the tracks adapted to abut the outside of a wall beneath the window, said braces being detachably connected to the tracks, said tracks having slotted openings in their upper surfaces and a seat having rollers mounted in the tracks and having connecting means for the rollers extending through the openings.

3. A window scaffold comprising a frame including a pair of horizontal tubular tracks, spacing bars detachably secured to the tracks adjacent opposite ends, a channel member slidably mounted at the inner ends of the tracks adapted to receive a window sill at the inside of the window, screw means carried by the inner spacing bar for clamping the channel member to the sill, braces for outer ends of the tracks adapted to abut the outside of a wall beneath the window, said braces being detachably connected to the tracks, said tracks having slotted openings in their upper surfaces and a seat having rollers mounted in the tracks and having connecting means for the rollers extending through the openings and adjustable stop means carried by the seat and engageable with the tracks.

4. A window scaffold comprising a frame including a pair of horizontal tubular longitudinally slotted transverse tracks, spacing bars detachably secured to the tracks adjacent opposite ends, a transverse channel member including collars slidably mounted at the inner ends of the tracks, said channel member being adapted to receive a window sill at the inside of the window, screw means carried by the inner spacing bar for clamping the channel member to the sill, braces for the outer ends of the tracks adapted to abut the outside of a wall beneath the window, said braces being detachably connected to the tracks and a seat slidably mounted in the slots of said tracks, said spacing bars constituting stops limiting movement of the seat in both directions and said collars having slots in alignment with the slots of the tracks to accommodate the seat during sliding movement thereof.

5. A window supported bracket comprising a frame projecting outwardly from the window and including a pair of spaced parallel horizontal tubular tracks having a longitudinal slot in the upper surface thereof, means for clamping the inner end of the frame to a window sill, a carrier slidably mounted on the tracks, headed members depending from the underside of the carrier and projecting into the tracks through said slots and a stop pin carried by the carrier and engageable with the track to secure the carrier in adjusted position thereon.

ROY B. WHITEMAN.